(12) United States Patent
Evans et al.

(10) Patent No.: US 6,348,796 B2
(45) Date of Patent: Feb. 19, 2002

(54) IMAGE FOCUSING METHOD AND APPARATUS FOR WELLBORE RESISTIVITY IMAGING

(75) Inventors: Martin Townley Evans, Norwich; Andrew Richard Burt, Lowestoft, both of (GB)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/754,431

(22) Filed: Jan. 4, 2001

Related U.S. Application Data

(60) Provisional application No. 60/175,585, filed on Jan. 11, 2000.

(51) Int. Cl.[7] ............................................... G01V 3/20
(52) U.S. Cl. ........................................ 324/374; 324/367
(58) Field of Search ................................ 324/374, 373, 324/375, 367, 356

(56) References Cited

U.S. PATENT DOCUMENTS

| | | | |
|---|---|---|---|
| 4,468,623 A | 8/1984 | Gianzero et al. | 324/367 |
| 4,692,707 A | 9/1987 | Locke et al. | 324/374 |
| 5,036,283 A | 7/1991 | Trouiller et al. | 324/375 |
| 5,502,686 A | 3/1996 | Dory et al. | 367/34 |

FOREIGN PATENT DOCUMENTS

CA 685727 5/1964

*Primary Examiner*—Walter E. Snow
(74) *Attorney, Agent, or Firm*—Madan, Mossman & Sriram, P.C.

(57) ABSTRACT

An apparatus for obtaining resistivity images of a borehole includes an array of measure electrodes separated from a pad or the body of the instrument by a guard electrode. The guard electrode is maintained at a slightly lower potential than the pad and the measure electrode is at an intermediate potential thereto. With this arrangement, the current from the guard electrode defocuses the measure current from the measure electrode as it enters the formation, and at greater distances, the current from the measure electrode is refocused by the effect of the current from the pad. This defocusing and refocusing defines a region of investigation away from the borehole wall that is relatively insensitive to borehole rugosity. Circumferential and vertical overlap may be obtained either by the arrangement of the measure electrodes, or by relying on the broadening of the measure beam as it enters the formation.

19 Claims, 5 Drawing Sheets

IMAGE FOCUSING METHOD AND APPARATUS FOR WELLBORE RESISTIVITY IMAGING

CROSS REFERENCES TO RELATED APPLICATIONS

This application claims priority from U.S. Provisional Patent Application Ser. No. 60/175,585 filed on Jan. 11, 2000.

BACKGROUND OF THE INVENTION

1. Field of the Invention

This invention generally relates to explorations for hydrocarbons involving electrical investigations of a borehole penetrating an earth formation. More specifically, this invention relates to highly localized borehole investigations employing the introduction and measuring of individual focused survey currents injected toward the wall of a borehole with a tool moved along the borehole.

2. Background of the Art

Electrical earth borehole logging is well known and various devices and various techniques have been described for this purpose. In an electrical investigation of a borehole, current from an electrode is introduced in the formation from a tool inside the borehole. There are two modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated.

Techniques for investigating the earth formation with arrays of measuring electrodes have been proposed. See, for example, the U.S. Pat. No. 2,930,969 to Baker, Canadian Pat. No. 685,727 to Mann et al. U.S. Patent No. 4,468,623 to Gianzero, and U.S. Pat. No. 5,502,686 to Dory et al.. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

The prior art devices, being contact devices, are sensitive to the effects of borehole rugosity: the currents flowing from the electrodes depend upon good contact between the electrode and the borehole wall. If the borehole wall is irregular, the contact and the current from the electrodes is irregular, resulting in inaccurate imaging of the borehole. A second drawback is the relatively shallow depth of investigation caused by the use of measure electrodes at the same potential as the pad and the resulting divergence of the measure currents.

SUMMARY OF THE INVENTION

The present invention is a method and apparatus for obtaining resistivity images of a borehole. The apparatus includes an array of measure electrodes separated from a pad or the body of the instrument by guard electrodes. The guard electrode is maintained at a slightly lower potential than the pad and the measure electrode is at an intermediate potential thereto. With this arrangement, the current from the measure electrode initially diverges as it enters the formation, then converges (focuses) and then finally diverges again to define a depth of investigation. This arrangement makes it relatively insensitive to borehole rugosity. If required, circumferential and vertical overlap may be obtained either by the arrangement of the measure electrodes to provide the overlap, or by relying on the broadening of the measure beam in a region of investigation within the formation.

DETAILED DESCRIPTION OF THE INVENTION

In order to gain a proper understanding of the present invention, reference is made to FIGS. 1–5.

Figure 1:
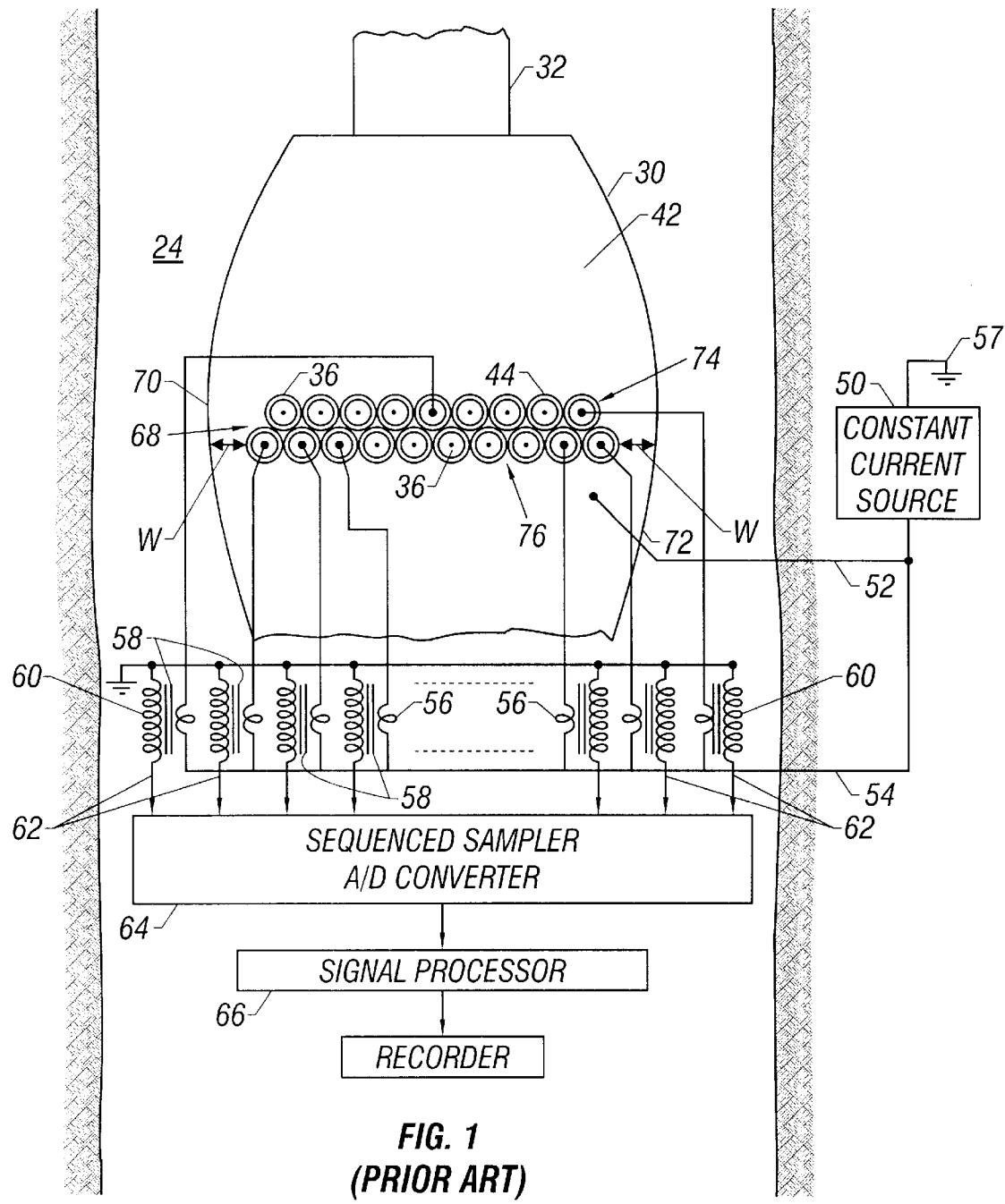
FIG. 1 (PRIOR ART) is a perspective and block diagram view of a borehole investigating tool with pads.

FIG. 1 (Prior Art) shows a pad 30 and array 70 of ten circular measure electrodes 36 as closely spaced as possible in a multiple number of rows 74, 76. The electrodes 36 are surrounded by insulator rings 44. Measure electrodes 36 are mounted flush on pad 30 whose surface 42 is conductive. Insulators 44 electrically isolate measure electrodes 36 from the conductive pad surface 42 while in the operation of a pad 30 the electrical potential of the several measure electrodes 36 and conductive surface 42 is effectively the same. The currents flowing from each of the electrodes 36 is indicative of the resistivity of the formation in contact with the electrode. The pad 30 or the body of the instrument (not shown) acts as an effective electrode.

Figure 2:
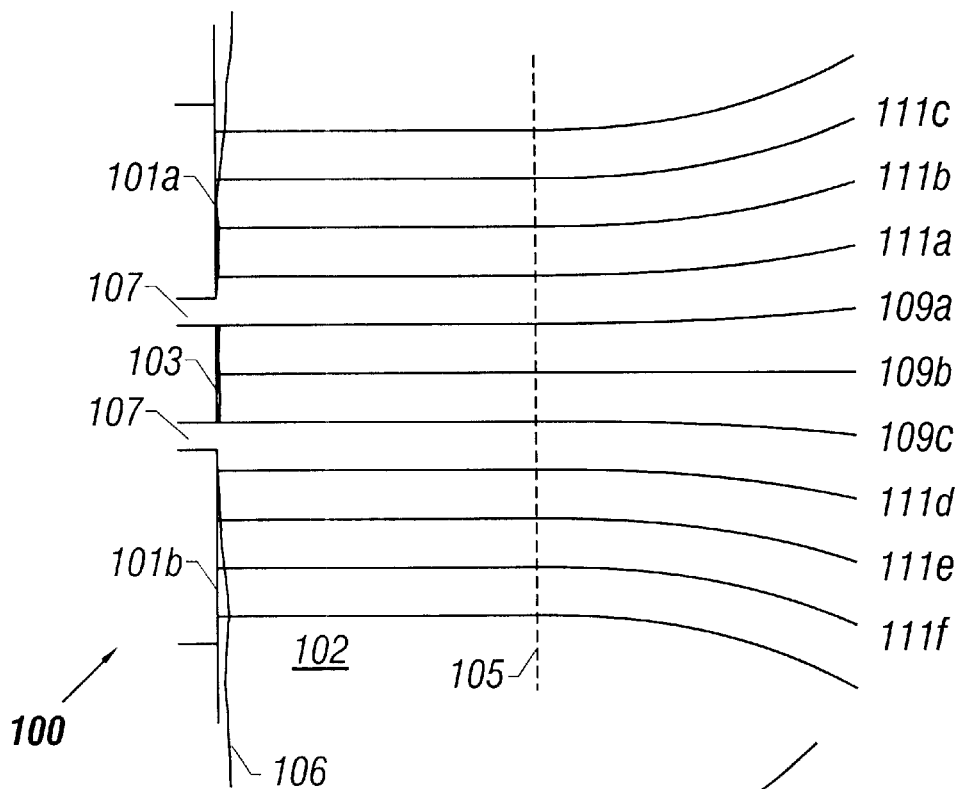
FIG. 2 illustrates an idealized current flow necessary for obtaining proper measurements using the tool of FIG. 1.

FIG. 2 shows a schematic cross section of a resistivity array device including a measure electrode. Shown is a device 100 in contact with a borehole wall 106 with a formation 102. The device includes a pad of which portions 101a, 101b are shown, along with a measure electrode 103 and gaps 107 electrically separating the measure electrode 103 from the pad. For simplifying the illustration, the connections between a source of electrical current and the measure electrode 103 and the pad 101a, 101b are not shown. Also shown within the formation 102 are idealized current paths of electrical current 109a, 109b and 109c from the measure electrode 103 and current paths of the electrical current 111a, 111b, . . . 111f from the pad. For the idealized situation shown the current flow is directly into the formation and the flow lines are parallel for a distance indicated by 105 after which the current paths start diverging. As those versed in the art would know, the current will ultimately return back to the source through a return electrode (not shown). The distance from the borehole wall 106 to 105 is the depth of investigation of the tool. The magnitude of the current flowing from the measure electrode 103 is indicative of the electrical conductivity of the formation adjacent to the measure electrode 103 up to the depth of investigation. In the prior art array resistivity devices, the currents from the individual measure electrodes are measured to give an indication of the conductivity of the formation adjacent to the electrodes.

Figure 3:
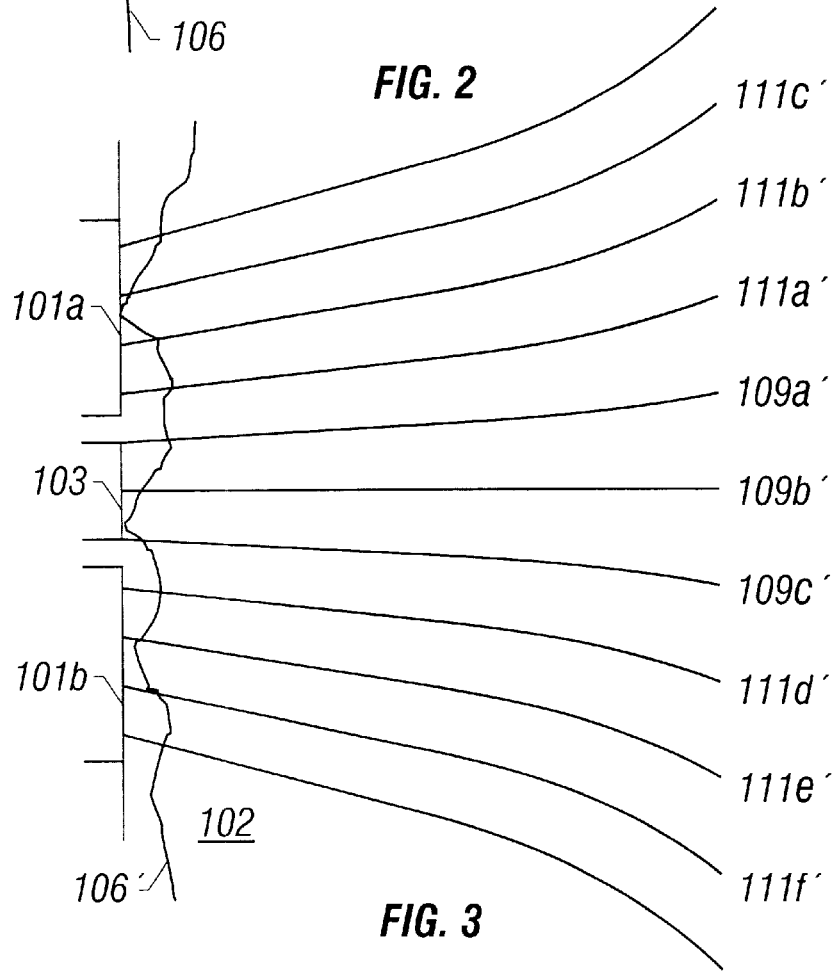
FIG. 3 illustrates the actual flow of current using the tool of FIG. 1.

Turning now to FIG. 3, the real situation is indicated. Due to the geometry of the pads, the conductive portion of the tool body in the vicinity of the pads and the geometry of the electrically isolating section of the tool between the pad section and the aforementioned return electrode, the electrical current from pad and the measure electrodes diverges quite rapidly. The is indicated by the paths 109a', 109b' and 109c' of current from the measure electrode 103 and the rapid divergence of the currents 111a'. . . 111f from the pad. As a result of this, the current flowing from the electrode 103 depends upon the conductivity of the formation in a first region in contact with the measure electrode as well as portions of the formations surrounding this first region. This reduces the resolution of the instrument. In addition, the current paths will be effected by irregularities in the borehole wall as indicated by 106'. Both of these effects (the divergence and the effects of rugosity) can give erroneous indications of formation conductivity.

These two problems are addressed in the present invention by use of a beam focusing technique. This technique causes the measure beam (current from the measure electrode) to be defocused as it leaves the instrument and then refocus again approximately ¼ to ½ inch (.625 to 1.25 cm.) away from the pad carrying the measure electrode. This desensitizes the image to the effects of borehole wall rugosity. This is described below.

Figure 4:
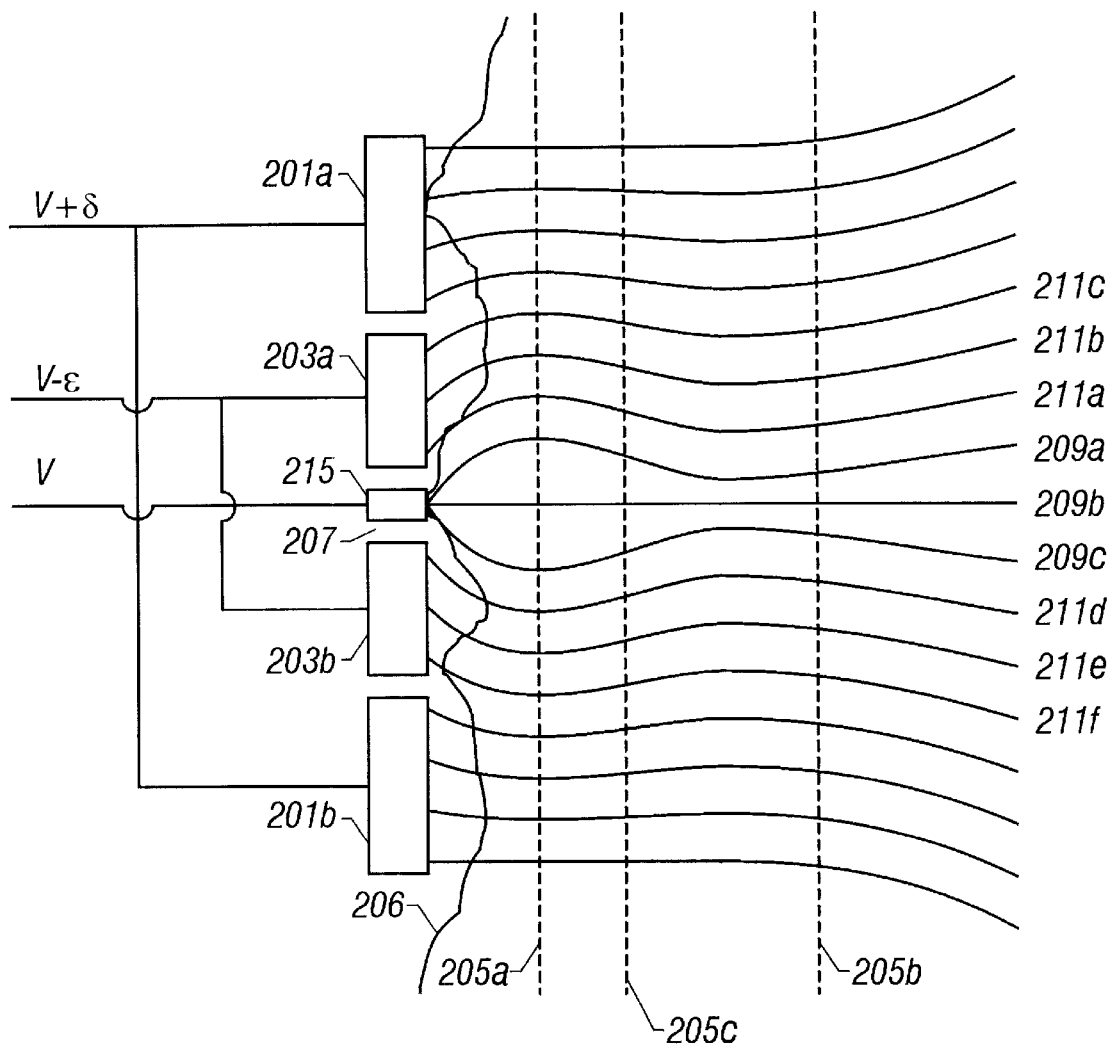
FIG. 4 is a schematic cross section illustrating the arrangement of electrodes and the flow of currents in an embodiment of the present invention.

Turning now to FIG. 4, a schematic cross section of the measure electrode of the present invention is shown. For illustrative purposes, a single measure electrode 215 is shown. This measure electrode is flanked by a primary guard electrode 203a, 203b that separate the measure electrode 215 from the pad or body of the instrument 201a, 201b. The measure electrode 215 is maintained at a voltage V that is higher than the voltage V−ϵ of the guard electrodes 203a, 203b but less than the voltage V+δ of the pad 201a, 201b. In a typical application, the voltage V is 5 volts while the values of δ and ϵ are of the order of 500 $\mu$V. These are the relative voltages when electrical current is flowing out of the measure electrodes.

In an alternate embodiment of the present invention, the arrangement of the electrodes is unchanged but the current flows into the measure electrodes. In such an arrangement, the magnitudes of the voltages are the same as discussed above. This configuration is not discussed further but would be a straightforward variation of the discussion here on current flowing out of the measure electrodes.

The lower potential of the primary guard 203a, 203b causes the current from the measure electrode 215 to diverge as it leaves the measure electrode. The more divergent the beam, the less the sensitivity to that element of the length of the measure beam. As the measure beam progresses further into the formation, the higher potential of the pad 201a, 201b causes the beam from the measure electrode 215 and the guard 203a, 203b to be pinched in, thereby increasing the sensitivity from that portion of the measure beam. Since the greatest divergence of the measure beam is closest to the borehole wall, the beam is quite insensitive to the effects of borehole rugosity. At large distances from the borehole wall such as 205b, the measure beam again diverges. The region between 205a and 205b includes the region of greatest sensitivity of the tool. The region of greatest sensitivity is roughly defined by the portion between 205c and 205b where the diameter of the measure beam is small, with the smallest value being attained at a distance between 205c and 205b. By suitable adjustment of the electrical potentials, it is possible to obtain a measure beam having a diameter within the sensitive region that is larger than or smaller than the diameter of the measure electrodes. The electrodes and the pad are connected to sources of electrical current to maintain the desired voltages and, as in prior art devices, the current from the measure electrode is indicative of formation conductivity.

One advantage of the present invention over prior art devices is the ability to make accurate measurements in irregular boreholes. As may be seen in FIG. 4, there is no requirement of physical contact between the entire measure electrode and the formation: all that is necessary is good electrical contact, even through any intervening borehole fluid. Due to the defocusing of the beam near the measure electrode, the present device is relatively insensitive to the presence of borehole fluid between portions of the electrode and the formation. Similarly, the invention also functions properly when there is incomplete physical contact between the guard electrode and the formation.

In the context of the present invention, the word "pad" is used here only for convenience and the invention would work equally well if the body of the instrument is used instead of the pad for the purpose of carrying measure electrodes and/or injecting currents into the formation as described below. Those versed in the art would recognize that the pad in the present invention does not actually have to contact the borehole wall. The primary function of the pad is to focus the measure beam after the defocusing caused by the guard electrode. This can be accomplished by a tool body that is not in actual contact with the borehole wall almost as well as by a pad in contact with the borehole wall. Accordingly, use of the word "pad" hereinafter and particularly in the claims is intended to include the body of the instrument as well.

Figure 5A:
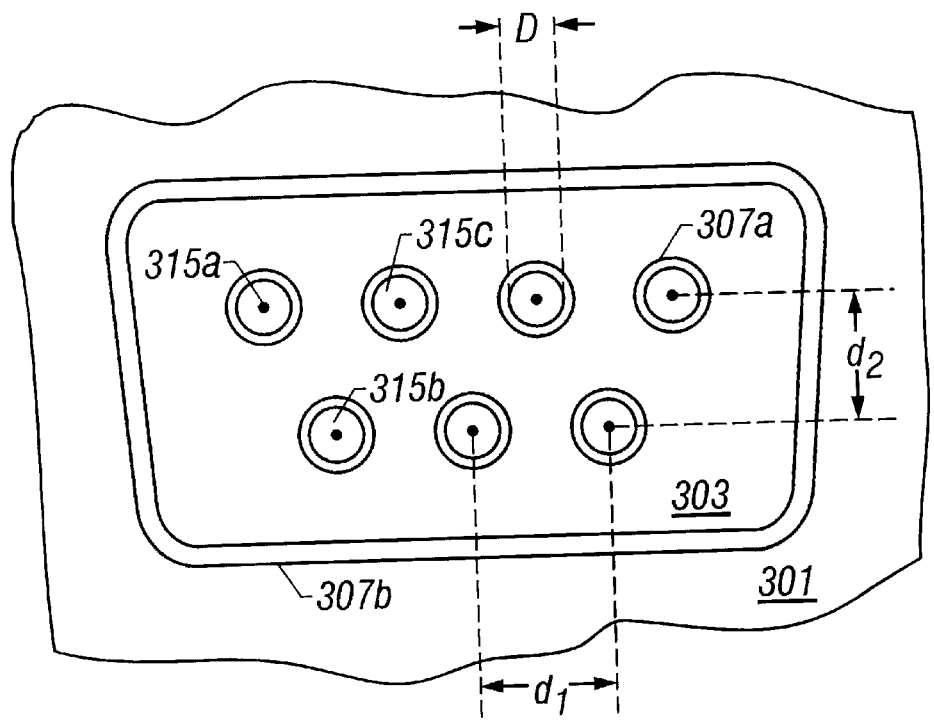
FIGS. 5A–5D are illustrations of arrangements of electrodes in various embodiments of the present invention.

Various configurations of measure electrodes, guard electrodes and pads may be used in the invention. FIG. 5a illustrates an array of measure electrodes 315a, 315b, 315c ... set within a substantially rectangular guard electrode 303 with gaps 307a (that contain insulating material therein). The guard electrode 303 is separated from the pad or body 301 by a substantially rectangular insulating gap 307b. In one embodiment of the invention, the spacing between the measure electrodes is selected as in the Gianzero patent to provide overlap in azimuth and depth, i.e., the diameter D of the measure electrode is greater than the horizontal spacing $d_1$ of the electrodes 315b, 315c in adjacent rows and the vertical spacing $d_2$ between the rows of electrodes. In another embodiment of the invention, the electrodes do not have this azimuthal an and vertical overlap, but due to the broadening of the measure beam discussed above in reference to FIG. 4, overlap in azimuth and borehole depth of the region of investigation is obtained.

Figure 5B:
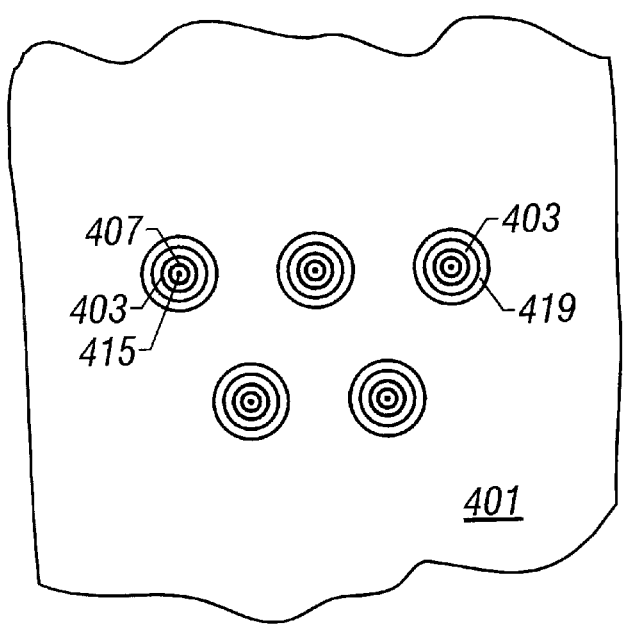

FIG. 5b depicts another arrangement of electrodes in the present invention. In this, the measure electrodes 415 are concentric with the guard electrodes 403. Insulating gaps 407 and 419 are also indicated. As with the embodiment discussed above with reference to FIG. 5a, the measure electrodes may or may not have overlap in azimuth and depth. When the measure electrodes themselves do not overlap, the broadening of the measure beam provides overlap of measurements at the depth of investigation.

Figure 5C:
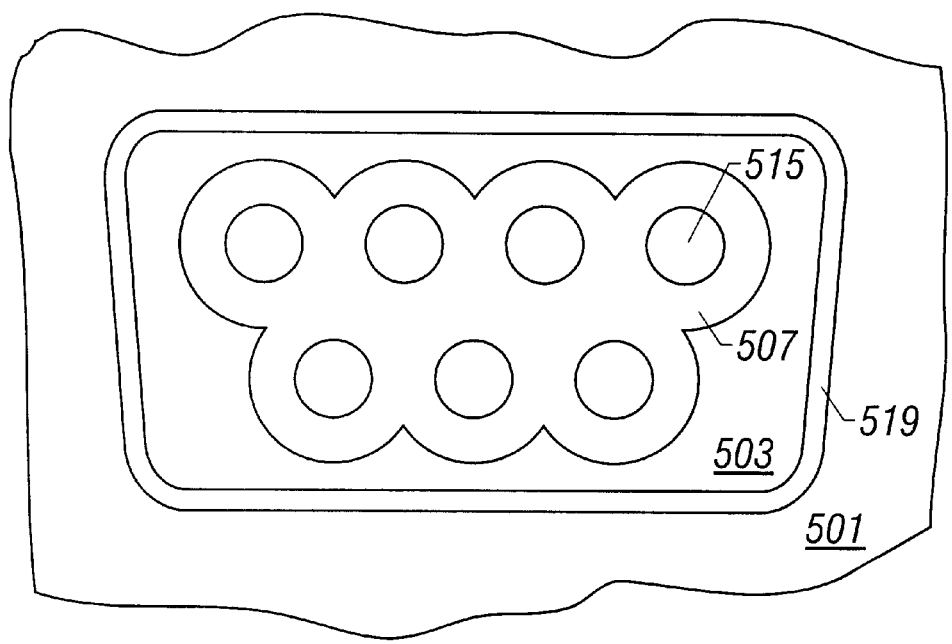

FIG. 5c illustrates an arrangement of measure electrodes 515 separated from a guard electrode 519 by insulating gap 503. The guard electrode 503 is, in turn, separated form the pad by insulating gap 519.

Figure 5D:
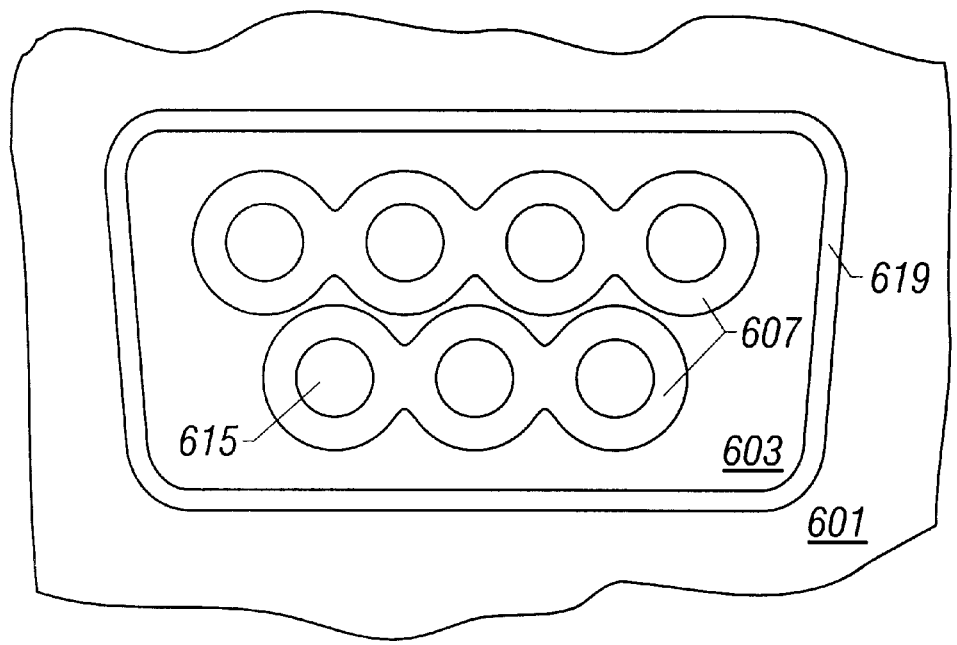

FIG. 5d illustrates a configuration of the measure electrodes measure electrodes 615 are arranged in two groups with insulating gaps 607. As in FIG. 5c, the guard electrode 603 is separated from the pad by another gap 619.

In another embodiment of the invention (not shown), a secondary guard electrode located between the pad and the guard electrode is used to provide the focusing of the beam in the region of investigation.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus conveyed in a borehole for obtaining a resistivity image of an earth formation penetrated by the borehole, the apparatus comprising:
   (a) a plurality of measure electrodes in electrical contact with the formation, each of the plurality of measure electrodes connected to a source of electrical current for conveying a beam of measure current corresponding to each measure electrode into the formation, said plurality of measure electrodes at a first electrical potential;
   (b) at least one guard electrode at a second potential substantially encircling each of said plurality of measure electrodes for conveying a current for defocusing the measure currents for a first distance into the formation, said second potential having a magnitude less than a magnitude of the first potential; and
   (c) a pad at a third electrical potential connected to a source of electrical current for conveying a current into the formation for refocusing the measure current at a second distance into the formation, said third potential greater having a magnitude greater than a magnitude of the first potential and said second distance being greater than the first distance.

2. The apparatus of claim 1 wherein the at least one guard electrode is at a distance that is one of (i) in contact with the formation, and, (ii) in close proximity to the formation.

3. The apparatus of claim 1 wherein the pad is at a distance that is one of (i) in contact with the formation, and, (ii) in close proximity to the formation.

4. The apparatus of claim 1 wherein the plurality of measure electrodes have a first diameter associated with each of the measure electrodes.

5. The apparatus of claim 1 wherein each beam of measure current has a second diameter at a distance related to the first distance and the second distance, said second diameter greater than the first diameter.

6. The apparatus of claim 5 wherein each beam of measure current has an effective diameter related to the first distance and the second distance wherein said effective diameter is less than the second diameter.

7. The apparatus of claim 4 wherein said measure electrodes are arranged in an array on the pad at intervals which are selected to space the measure electrodes along circumferential and borehole axis directions to provide overlap of the first diameter of the plurality of electrodes.

8. The apparatus of claim 6 wherein said measure electrodes are arranged in an array on the pad at intervals which are selected to space the measure electrodes along circumferential and borehole axis directions to provide overlap of the effective diameter of the measure current associated with each of the plurality of electrodes.

9. The apparatus of claim 1 wherein the at least one guard electrode comprises a plurality of guard electrodes, said plurality of guard electrodes less than or equal to the plurality of measure electrodes.

10. The apparatus of claim 1 further comprising a meter for measuring the current at each of the measure electrodes.

11. The apparatus of claim 1 further comprising a meter for measuring a potential of each of the measure electrodes.

12. A method of obtaining a resistivity image of an earth formation penetrated by a borehole, the method comprising:
   (a) connecting a source of electrical current to each of a plurality of measure electrodes at a first electrical potential in electrical contact with the formation and conveying a beam of measure current corresponding to each measure electrode into the formation;
   (b) using at least one guard electrode at a second potential substantially encircling each of said plurality of measure electrodes thereby defocusing the measure currents for a first distance into the formation, and wherein a magnitude of said second potential is less than a magnitude of the first potential; and
   (c) using one of (i) a pad, and, (ii) a secondary guard electrode, at a third electrical potential connected to a source of electrical current for conveying a current into the formation for refocusing the measure current at a second distance into the formation, said third potential having a magnitude greater than a magnitude of the first potential and said second distance greater than the first distance.

13. The method of claim 12 wherein the at least one guard electrode is at a distance that is one of (i) in contact with the formation, and, (ii) in close proximity to the formation.

14. The method of claim 12 wherein the pad is at a distance that is one of (i) in contact with the formation, and, (ii) in close proximity to the formation.

15. The method of claim 12 further comprising defining an effective diameter for each of the measure beams within the formation.

16. The method of claim 12 further comprising arranging the measure electrodes arranged in an array on the pad at intervals which are selected to space the measure electrodes along circumferential and borehole axis directions to provide overlap of a diameter of the plurality of electrodes.

17. The method of claim 15 further comprising arranging the measure electrodes arranged in an array on the pad at intervals which are selected to space the measure electrodes along circumferential and borehole axis directions to provide overlap of the effective diameter of each of the measure beams within the formation.

18. The measure of claim 12 further comprising measuring the current at each of the measure electrodes.

19. The measure of claim 12 further comprising measuring the electrical potential at each of the measure electrodes.

* * * * *